(12) United States Patent
Zhang et al.

(10) Patent No.: US 10,545,231 B2
(45) Date of Patent: *Jan. 28, 2020

(54) COMPRESSING RADIO MAPS USING DIFFERENT COMPRESSION MODELS

(71) Applicant: Apple Inc., Cupertino, CA (US)

(72) Inventors: Wuzhou Zhang, Santa Clara, CA (US); Benjamin A. Detwiler, Menlo Park, CA (US); David Benjamin Millman, Mountain View, CA (US); Jasvinder Singh, Santa Clara, CA (US); Anders M. Holtsberg, Los Gatos, CA (US); Darin Tay, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/147,100

(22) Filed: Sep. 28, 2018

(65) Prior Publication Data

US 2019/0137621 A1    May 9, 2019

Related U.S. Application Data

(63) Continuation-in-part of application No. 15/721,596, filed on Sep. 29, 2017, now Pat. No. 10,151,824.

(Continued)

(51) Int. Cl.
*H04W 24/00*    (2009.01)
*G01S 13/89*    (2006.01)
(Continued)

(52) U.S. Cl.
CPC ............ *G01S 13/89* (2013.01); *G01S 5/0252* (2013.01); *G01S 11/06* (2013.01); *H04B 17/318* (2015.01)

(58) Field of Classification Search
CPC ....... H04W 64/00; H04W 4/02; H04W 24/00; H04W 24/08
(Continued)

(56) References Cited

U.S. PATENT DOCUMENTS 6,006,077 A  * 12/1999  Shull .................... H04B 17/318
                                                         455/226.2
7,406,116 B2    7/2008  Agrawala et al.
(Continued)

FOREIGN PATENT DOCUMENTS

EP         2426460 A1     2/2012
WO      2015/007756      1/2015
WO      2016/169601     10/2016

*Primary Examiner* — Temica M Beamer
(74) *Attorney, Agent, or Firm* — Fish & Richardson P.C.

(57) ABSTRACT

Embodiments are disclosed for compressing radio maps of fingerprint-based positioning systems using different compression models. In an embodiment, a method comprises: receiving, by a computing device, access point (AP) data from a plurality of mobile devices operating in a geographic region, the AP data including signal strength measurements of AP signals received at a plurality of reference locations in the geographic region and uncertainty measurements associated with the signal strength measurements; determining a level of accuracy with the first compression model; responsive to the determining, selecting one of the first compression model or a second compression model to compress the AP data, the second compression model being different than the first compression model; compressing the AP data using the selected compression model; and responsive to a request from a mobile device operating in the geographic region, sending a data packet including the compressed AP data to the mobile device.

20 Claims, 9 Drawing Sheets

Related U.S. Application Data

(60) Provisional application No. 62/679,605, filed on Jun. 1, 2018, provisional application No. 62/514,759, filed on Jun. 2, 2017.

(51) Int. Cl.
  *G01S 11/06* (2006.01)
  *G01S 5/02* (2010.01)
  *H04B 17/318* (2015.01)

(58) Field of Classification Search
  USPC ......... 455/456.1, 456.5, 456.6, 67.11, 67.13, 455/226.1, 226.2
  See application file for complete search history.

(56) References Cited

U.S. PATENT DOCUMENTS

| | | |
|---|---|---|
| 7,466,986 B2 | 12/2008 | Halcrow et al. |
| 2006/0004515 A1 | 1/2006 | McDonough |
| 2007/0096945 A1 | 5/2007 | Rasmussen et al. |
| 2007/0244632 A1 | 10/2007 | Mueller |
| 2008/0176583 A1 | 7/2008 | Brachet et al. |
| 2009/0149197 A1 | 6/2009 | Morgan et al. |
| 2010/0076968 A1 | 3/2010 | Boyns et al. |
| 2011/0176523 A1 | 7/2011 | Huang et al. |
| 2012/0157115 A1 | 6/2012 | Jeong |
| 2013/0288704 A1 | 10/2013 | Wirola |
| 2013/0331116 A1 | 12/2013 | Grosman et al. |
| 2015/0080019 A1 | 3/2015 | Edge |
| 2017/0325070 A1* | 11/2017 | Wirola .................. G01S 5/0252 |
| 2018/0176731 A1* | 6/2018 | Hashisho ............. H04W 4/023 |

* cited by examiner

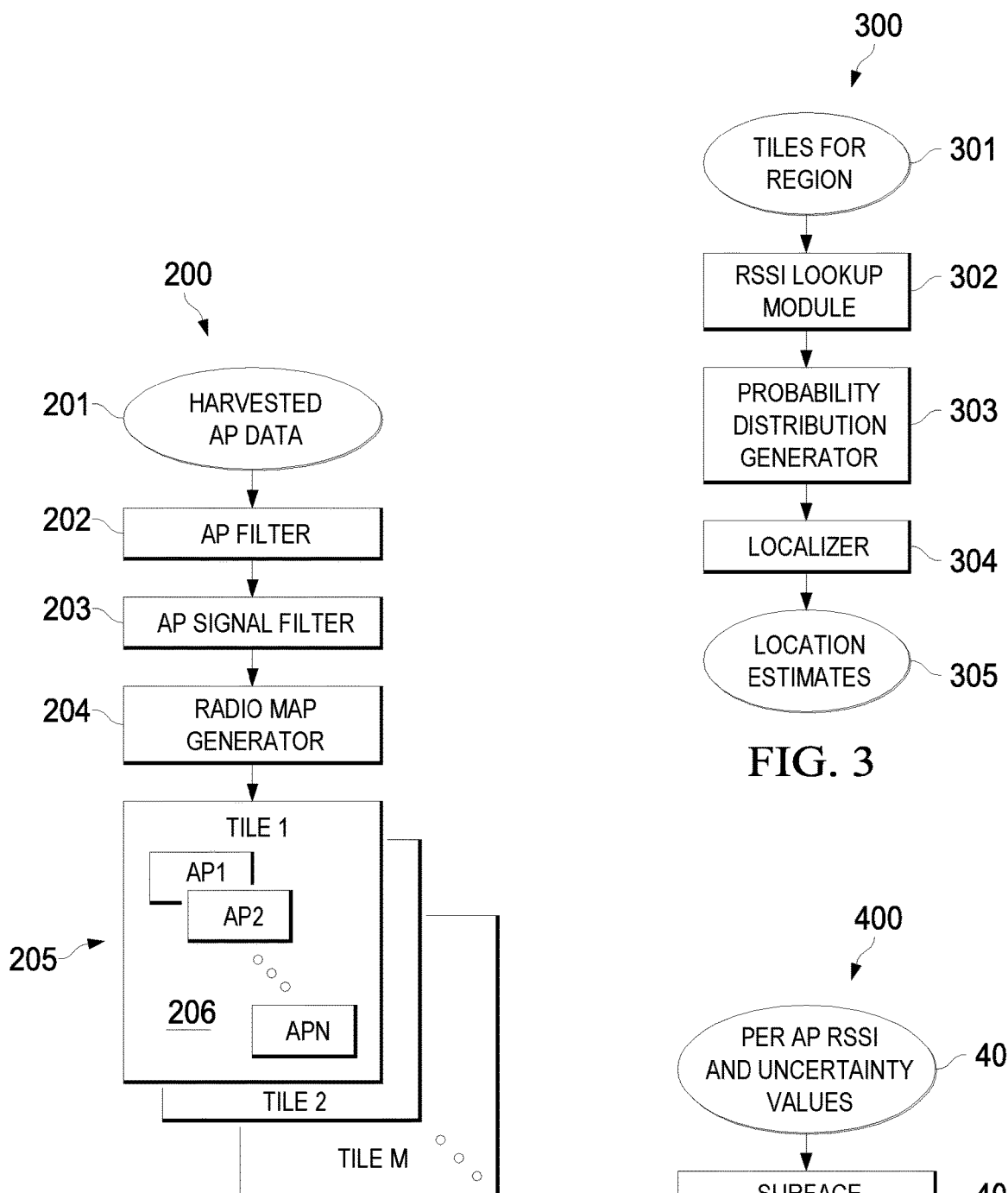
FIG. 2
FIG. 3
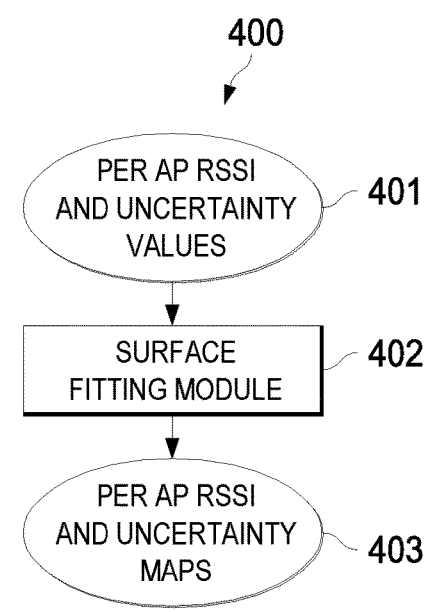
FIG. 4A

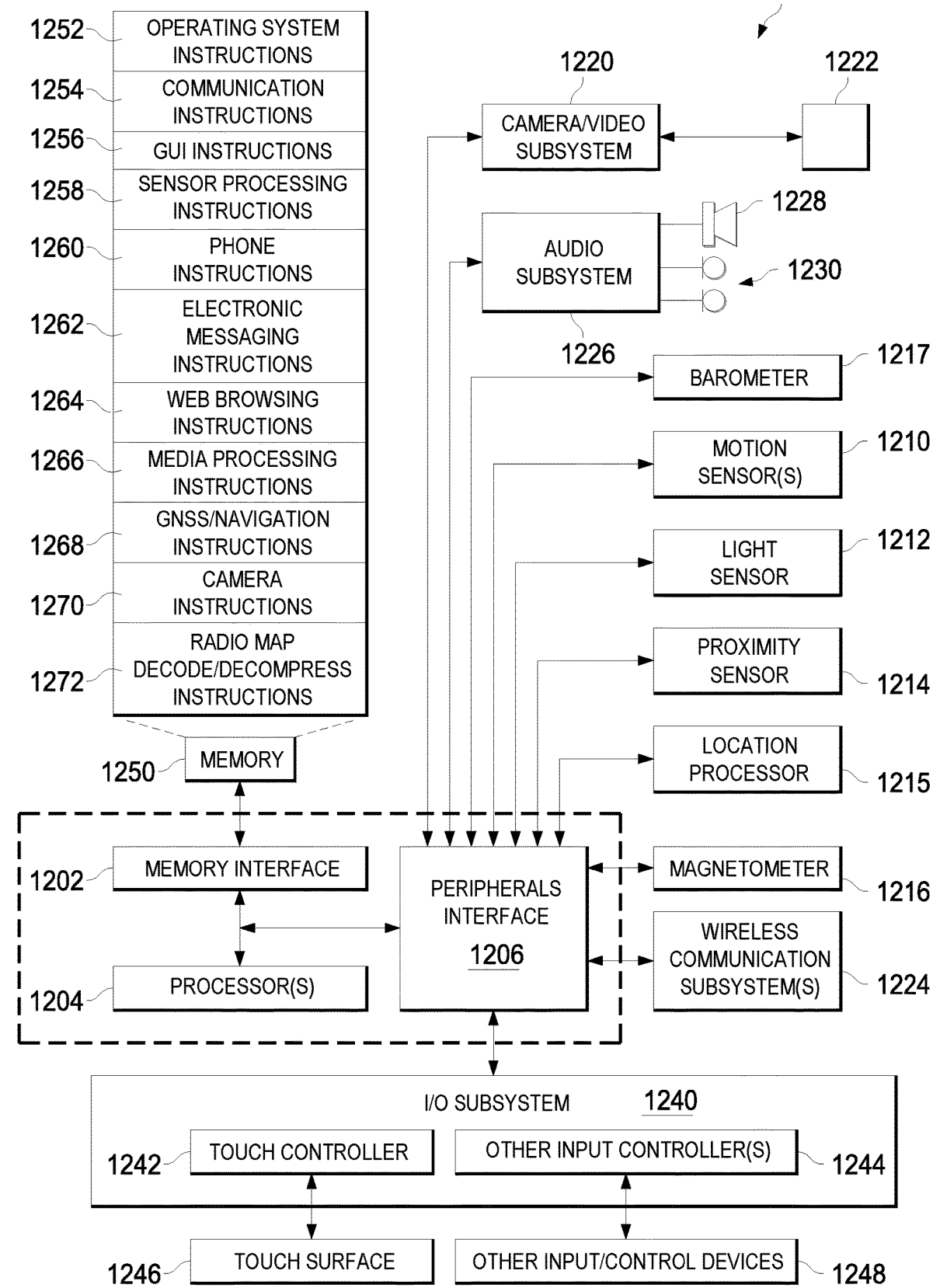

COMPRESSING RADIO MAPS USING DIFFERENT COMPRESSION MODELS

CROSS-REFERENCE TO RELATED APPLICATIONS

This application claims priority to U.S. Provisional Application No. 62/679,605, filed Jun. 1, 2018, and is a continuation-in-part of U.S. patent application Ser. No. 15/721,596, entitled "Compressing Radio Maps," filed Sep. 29, 2017, issued as U.S. Pat. No. 10,151,824 on Dec. 11, 2018, which claims priority to U.S. Provisional Patent Application No. 62/514,759, filed Jun. 2, 2017, the entire contents of each of which are incorporated herein by reference.

TECHNICAL FIELD

This disclosure relates generally to fingerprint-based positioning systems.

BACKGROUND

Outdoor positioning systems typically cluster harvested access point (AP) signal measurements from a large number of mobile devices. Because outdoor positioning systems rely on satellite signal visibility, the clustering approach does not work indoors or in outdoor spaces where satellite signals are blocked or where the quality of satellite signals is poor due to multipath. One solution for improving outdoor localization in spaces with poor signal reception is to use indoor positioning techniques to estimate location. For example, an outdoor space, such as an "urban canyon", is divided into a grid. The grid can be irregularly shaped and include cells that have no signal data or only sparse signal data. In this case, the grid includes a large number of radio maps, where the radio maps include "fingerprints" collected at reference locations within the outdoor space, and each fingerprint includes an identification and received signal strength of the APs observable at the reference location. Due to the high cost of cellular data service and the limited storage capacity of the typical mobile device, it is desirable to compress the radio maps before serving the radio maps to mobile devices for use in location estimation.

SUMMARY

Embodiments are disclosed for compressing radio maps of fingerprint-based positioning systems using different compression models.

In an embodiment, a method comprises: receiving, by a computing device, access point (AP) data from a plurality of mobile devices operating in a geographic region, the AP data including signal strength measurements of AP signals received at a plurality of reference locations in the geographic region and uncertainty measurements associated with the signal strength measurements; determining a level of accuracy with the first compression model; responsive to the determining, selecting one of the first compression model or a second compression model to compress the AP data, the second compression model being different than the first compression model; compressing the AP data using the selected compression model; and responsive to a request from a mobile device operating in the geographic region, sending a data packet including the compressed AP data to the mobile device.

In an embodiment, a system comprises: one or more processors; memory storing instructions, that when executed by one or more processors, cause the one or more processors to perform operations comprising: receiving access point (AP) data from a plurality of mobile devices operating in a geographic region, the AP data including signal strength measurements of AP signals received at a plurality of reference locations in the geographic region and uncertainty measurements associated with the signal strength measurements; determining a level of accuracy with the first compression model; responsive to the determining, selecting one of the first compression model or a second compression model to compress the AP data, the second compression model being different than the first compression model; compressing the AP data using the selected compression model; and responsive to a request from a mobile device operating in the geographic region, sending a data packet including the compressed AP data to the mobile device.

Particular embodiments disclosed herein provide one or more of the following advantages. The disclosed embodiments allow compression of radio maps delivered in tiles to mobile devices for use in location estimation. The compressed radio maps reduce the cost of cellular data service for users and also reduce the amount of data stored on mobile devices which often have limited storage capacity. Multiple versions of tiles with different resolutions can be generated to mobile devices based on memory and processing constraints of the mobile device and a desired location estimation accuracy. Further efficiencies can be realized by using different compression models.

The details of one or more implementations of the subject matter are set forth in the accompanying drawings and the description below. Other features, aspects and advantages of the subject matter will become apparent from the description, the drawings and the claims.

BRIEF DESCRIPTION OF THE DRAWINGS

FIG. 2 is a flow diagram of a server-side FPS processing pipeline, according to an embodiment.

FIG. 3 is a flow diagram of a client-side FPS processing pipeline, according to an embodiment.

FIGS. 4A-4C illustrate surface fitting to AP data, according to an embodiment.

FIG. 12 illustrates an example device architecture of a mobile device implementing client-side FPS features and operations described in reference to FIGS. 1-10.

DETAILED DESCRIPTION

Example Fingerprint-Based Positioning System

Figure 1:
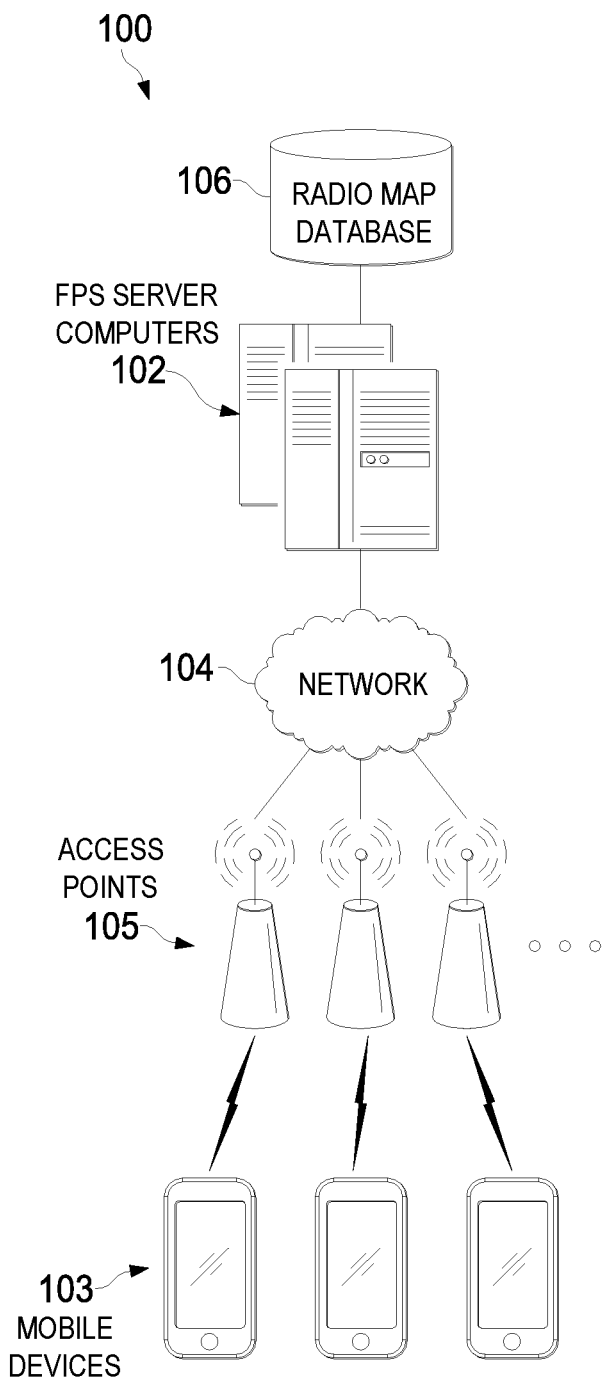
FIG. 1 illustrates an example fingerprint-based positioning system (FPS), according to an embodiment.

FIG. 1 illustrates an example FPS system 100, according to an embodiment. System 100 includes FPS server computers 102, mobile device 103, network 104, access points (APs) 105 and radio map database 106. RF signals transmitted by APs 105 are measured by mobile devices 103 operating in various geographic regions. An RF signal measurement is typically in the form of a received signal strength indicator (RSSI), which is the metric used by the embodiments described herein. It should be noted, however, that other measurements of RF signal strength can be used with the disclosed embodiments.

FPS 100 collects AP data packets from a large number of mobile devices 103 to build FP database 106. The AP data packets include harvested (e.g., crowd-sourced) and surveyed AP data for a particular reference location in the geographic region, also referred to herein as "reference location". An AP can be any wireless network AP, including a WiFi router or a cell tower transmitter. The AP data typically includes position data for the reference location (e.g., latitude, longitude, altitude, position uncertainty) provided by a survey map, global navigation satellite system (GNSS) receiver, WiFi position system or cell tower trilateration. The AP data also includes RSSI values and media access control (MAC) addresses for APs that are observed (scanned) at each reference location. If available, the AP data also includes GNSS velocity and/or pedestrian dead reckoning (PDR) data generated from equations of motion on mobile devices 103, such as position, velocity (speed) and heading. The PDR data can be generated from inertial sensor data provided by inertial sensors on the mobile device (e.g., accelerometer, gyro, magnetometer). Some AP data may also include barometric pressure data (e.g., provided by a pressure sensor on the mobile device) that can be used to indicate the altitude of the reference location.

FPS servers 102 calculate probability distributions of the RSSI values (e.g., Rayleigh, Rician, Gaussian distributions, etc.) for each AP observed at each reference location. The radio maps are stored in radio map database 106. In response to a request from a mobile device, FPS server computers 102 download a data packet or "tile" to the mobile device that includes compressed radio maps as described in further detail below in reference to FIG. 2

FIG. 2 is a flow diagram of a server-side FPS processing pipeline 200, according to an embodiment. Pipeline 200 includes AP filter 202, AP signal filter 203 and radio map generator 204. AP data 201 is collected from a large number of mobile devices and initially stored in a database separate from the FPS production system.

AP filter 202 determines whether AP locations in AP data 201 are servable or not-servable to mobile devices. An AP location is not servable if, for example, the AP location has moved over a specified time period, or a portion of outlier AP data is too high even if the estimated position of an AP has not moved. AP locations that are servable are sent to mobile devices for use in location estimation. AP locations that are not servable are not sent to mobile devices for use in location estimation. In an embodiment, AP data 201 can be clustered and APs that have moved between clusters are moving APs. Some examples of suitable clustering algorithms include but are not limited to: DBSCAN, k-means and hierarchical cluster analysis (HCA). A technique for identifying moving APs is described in co-pending U.S. patent application Ser. No. 15/713,493, filed on Sep. 22, 2017, which patent application is incorporated by reference herein in its entirety.

In an embodiment, an AP may be excluded from further processing based on memory cost, sighting probabilities and/or coverage. For example, each AP can be ranked based on a score that is a function of memory cost, cumulative sighting and probability over all cells. The APs can then be included in, or excluded from, further processing based on their scores. In an embodiment, a greedy algorithm can be used to determine scores.

AP signal filter 203 receives the filtered AP data from AP filter 202 and clusters the RSSI values in the AP data to identify outlier RSSI values. For example, RSSI values that are less than a minimum threshold and greater than a maximum threshold may be considered outlier RSSI values and excluded from further processing. Some examples of suitable clustering algorithms include but are not limited to: DBSCAN, k-means and HCA.

Radio map generator 204 receives the AP data output by AP signal filter 203 and performs surface fitting to generate RSSI and uncertainty maps, as described in reference to FIGS. 4 and 5. In an embodiment, radio map generator 204 also generates tiles 205 including radio maps 206 having different resolutions based on tradeoffs between mobile device memory and processing constraints and location estimation accuracy. To achieve different resolutions, some of tiles 205 may include more radio maps 206 than other tiles 205, or have different cell sizes. For example, a tile created for a dense urban environment may have more radio maps than a tile for a rural environment. Or, in another example, an open parking lot adjacent to a mall may need a lower cell resolution than the cell resolution used in the mall.

FIG. 3 is a flow diagram of a client-side FPS pipeline 300, according to an embodiment. Tiles 301 for a geographic region, which were generated using pipeline 200, are prefetched or downloaded on-the-fly to a mobile device operating at a location (x, y) in a geographic region. In an embodiment, selected ones of tiles 301 that match the memory or processing constraints of the mobile device and desired location accuracy for the location (x, y) are used for localization.

When an AP is observed at location (x, y), RSSI lookup module 302 decodes and decompresses radio maps 206 that are included in tiles 301 and stores them in local cache memory. An RSSI prediction at location (x, y) is then computed using an interpolation function f (x, y) using the RSSIs at the surface control points. In an embodiment, the function f (x, y) is bilinear and the RSSI values at the four surface control points (Q11, Q12, Q21, Q22) that are nearest to location (x, y) are used in the bilinear interpolation function f (x, y) as shown in Equations [1] and [2].

$$f(x, y) \approx b_{11} f(Q_{11}) + b_{12} f(Q_{12}) + b_{21} f(Q_{21}) + b_{22} f(Q_{22}), \quad [1]$$

$$\begin{bmatrix} b_{11} \\ b_{12} \\ b_{21} \\ b_{22} \end{bmatrix} = \left( \begin{bmatrix} 1 & x_1 & y_1 & x_1 y_1 \\ 1 & x_1 & y_2 & x_1 y_2 \\ 1 & x_2 & y_1 & x_2 y_1 \\ 1 & x_2 & y_2 & x_2 y_2 \end{bmatrix}^{-1} \right)^T \begin{bmatrix} 1 \\ x \\ y \\ xy \end{bmatrix}. \quad [2]$$

where $(x_1, y_1)$, $(x_1, y_2)$, $(x_2, y_1)$, $(x_2, y_2)$ are the locations of the surface control points Q11, Q12, Q21, Q22, respectively, in a blob of RSSI values projected on a two-dimensional (2D) grid, as described in reference to FIGS. 4 and 5. Using Equations [1] and [2] and the RSSI values at the surface control points and their (x, y) locations in the 2D blob, the RSSI prediction at location (x, y) can be computed by localizer 304 of the mobile device, as described below. Because only the encoded RSSI values at the surface control points and their respective locations in the 2D blob are sent to the mobile device (rather than all of the RSSI values in neighboring cells), compression is achieved.

Other interpolation functions can also be used for RSSI prediction, including but not limited to: bicubic, trilinear or spline interpolation. In an embodiment, region quadtrees can be used to lookup radio maps 206 of arbitrary resolutions. A quadtree is a tree data structure in which each internal node has exactly four children. The quadtree can partition a given geographic region recursively by subdividing it into four quadrants or regions. The regions may be square or rectangular or may have arbitrary shapes. In an embodiment RSSI lookup module 302 selects the nearest four (or less) surface control points $Q_{11}$, $Q_{12}$, $Q_{21}$, $Q_{22}$ in the quadtree whose convex hull covers the location (x, y).

Next, probability distribution generator 303 calculates a probability distribution over location (x, y), where the probability depends on a difference between predicted and observed RSSI values plus uncertainty values. The probability distribution can then be propagated using localizer 304 to generate location estimates 305. Localizer 304 can be any suitable localizer, including but not limited to: a particle filter, Kalman filter or least squares estimator.

In an embodiment, the predicted RSSI values represent a mode parameter of a Rayleigh distribution, e.g., if we take multiple Rayleigh distributions with a single parameter (predicted_rssi). A Rayleigh distribution can be represented mathematically by Equation [3]:

$$f(x; \sigma) = \frac{x}{\sigma^2} e^{\frac{-x^2}{(2\sigma^2)}}, x \geq 0. \quad [3]$$

where sigma σ is the predicted RSSI (predicted_rssi) and x is the observed RSSI (observed_rssi) to get the conditional probability P(x,y|observed_rssi, predicted_rssi). The predicted uncertainty value α (predicted_uncertainty) is combined with P(x,y|observed_rssi, predicted_rssi) as shown in Equation [4]:

final_probability=α*p(x,y| . . . )+(1−α)*prior_probability, [4]

where prior_probability is a fixed tunable parameter.

In another embodiment, it is assumed that predicted_rssi and predicted_uncertainty represent the mean and variance of a Gaussian distribution. In this embodiment, the probability can be found by substituting the parameters x, μ, σ, with observed_rssi, predicted_rssi and predicted_uncertainty, respectively, in Equation [5]:

$$f(x \mid \mu, \sigma^2) = \frac{1}{\sqrt{2\pi\sigma^2}} e^{\frac{-(x-\mu)^2}{2\sigma^2}}. \quad [5]$$

Figure 4B:
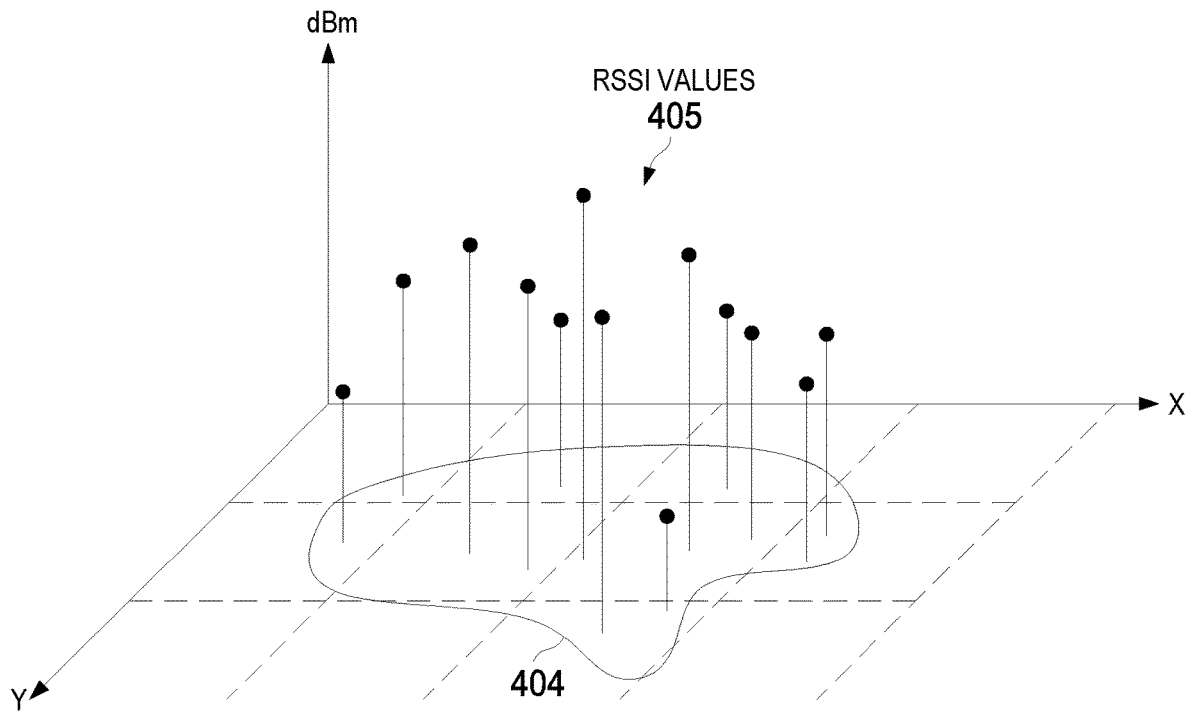
Figure 4C:
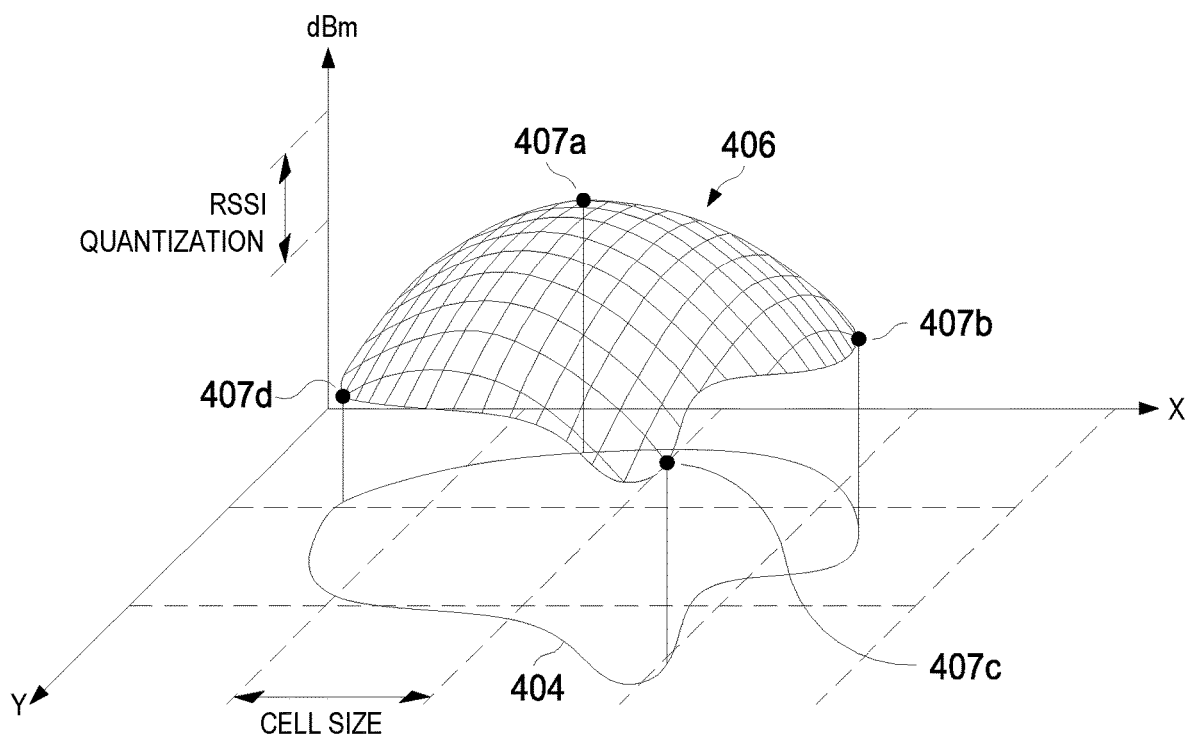

FIGS. 4A-4C illustrate surface fitting to RSSI values, according to an embodiment. As shown in FIG. 4A, surface fitting is performed by surface fitting module 402, which takes as input RSSI values and the associated uncertainty values for a given AP, and outputs RSSI and uncertainty maps 206 (collectively, referred to as "compressed radio maps") for the given AP. Any suitable interpolation function can be used for surface fitting, including but not limited to: bilinear, bicubic, trilinear and spline interpolation. In the example shown, bilinear interpolation is used.

FIG. 4B illustrates RSSI values 405 for a given AP that are taken from neighboring or contiguous cells (e.g., 7 cells). Any number of neighboring or contiguous cells can be selected based on memory/processing and accuracy tradeoffs. RSSI values 405, when projected onto a 2D image plane, define a 2D blob 404, which bounds the geographic area where RSSI values 405 were harvested/surveyed. Blob 404 can include all of the neighboring cells and/or portions of the neighboring cells and can be any shape and size.

FIG. 4C shows surface 406 fitted to RSSI values 405, resulting from the application of bilinear interpolation and four surface control points. In an embodiment, surface control points are at locations $(x_1, y_1)$, $(x_1, y_2)$, $(x_2, y_1)$, $(x_2, y_2)$ in blob 404. In the example, corners of grid cells are used. RSSI values 407a-407d at the surface control locations (the values $f(Q_{11})$, $f(Q_{12})$, $f(Q_{21})$, $f(Q_{22})$ in Equation [1]) and their respective locations $((x_1, y_1), (x_1, y_2), (x_2, y_1), (x_2, y_2))$ can then be encoded, as described in reference to FIGS. 5A and 5B, to achieve compression gain.

In an embodiment, the surface control points can be selected as points on a regular 2D grid, as shown in FIG. 4C. In other embodiments, surface control points are selected using an iterative end-point fit algorithm (e.g., the Ramer-Douglas-Peucker algorithm) or any other known algorithm that can be used for selecting surface control points (e.g., Visvalingam-Whyatt, Reumann-Witkam, Opheim simplification, Lang simplification, Zhao-Saalfeld).

In an embodiment, bilinear interpolation can be achieved more efficiently using a cell adjustment process. First, a course grid is selected and bilinear fitting is performed on RSSI values in the coarse grid. For each set of N neighboring cells in the coarse grid (e.g., four neighboring cells), a joint likelihood of the RSSI values falling between the N cells is computed. If the joint likelihood is below a threshold, the N cells are divided in half to create a finer grid and bilinear fitting is performed again on the finer grid. This dividing and surface fitting process continues until the joint likelihood of the N neighboring cells is greater than or equal to the threshold, at which point the process stops.

In an embodiment, additional compression gain is achieved by quantizing the RSSI values to a number of quantization levels before surface fitting. For example, the RSSI values can be placed in bins, where each been spans a range of RSSI values. Each bin can be assigned a signal RSSI value (an RSSI quantization level). Each RSSI value that falls within a given bin is replaced by the RSSI quantization level. The quantization levels can be uniform or not uniform. For example, the RSSI range [−100, 0] can be divided non-uniformly into the quantization levels (−100, −50), (−49, −25), (−25, −5), (−5, 0). The quantization levels need not be uniform because the RSSI levels do not necessarily carry the same amount of information.

Figure 5A:
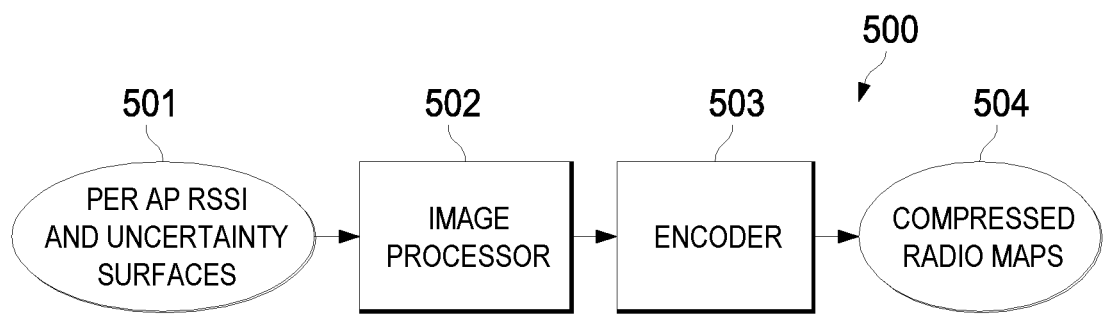
FIGS. 5A-5C illustrate contour detection and blob boundary encoding, according to an embodiment.
Figure 5B:
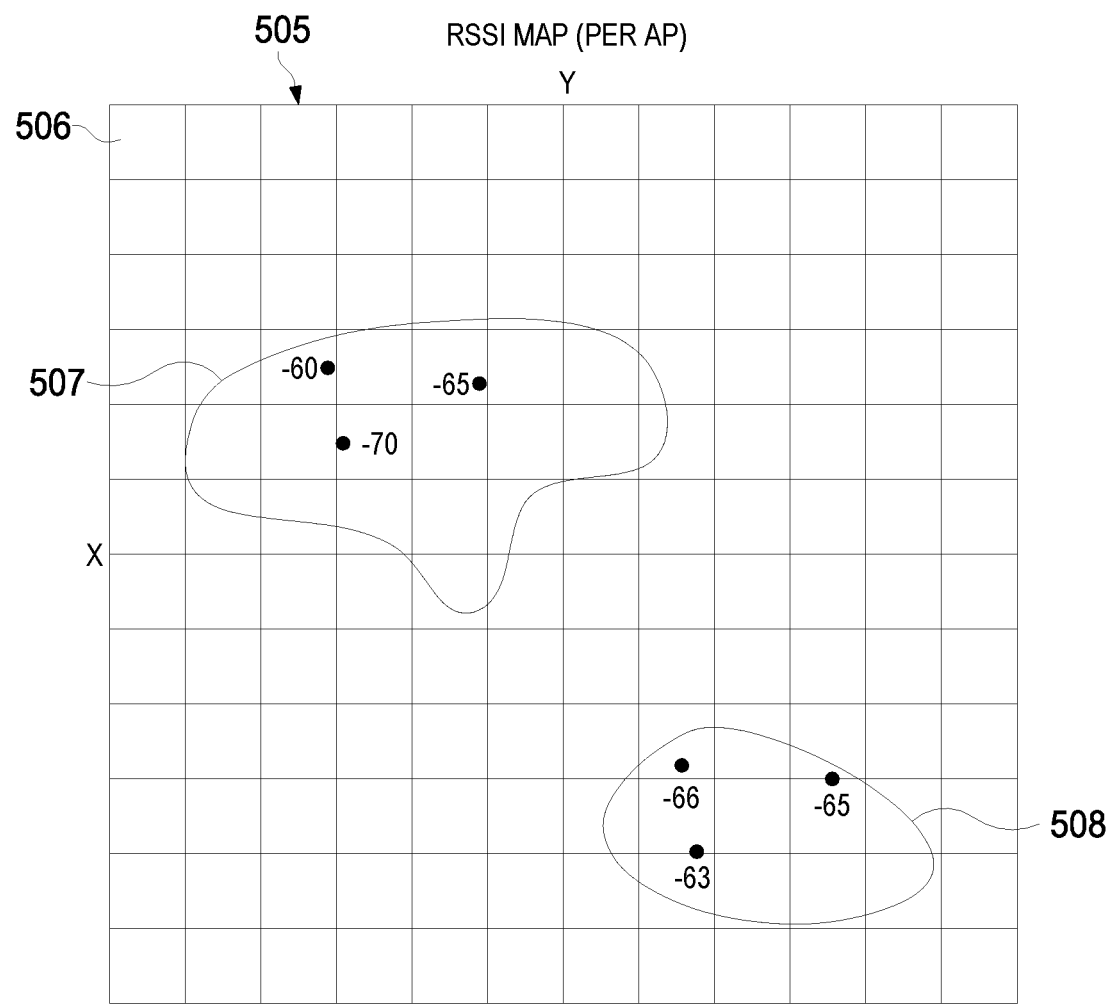
Figure 5C:
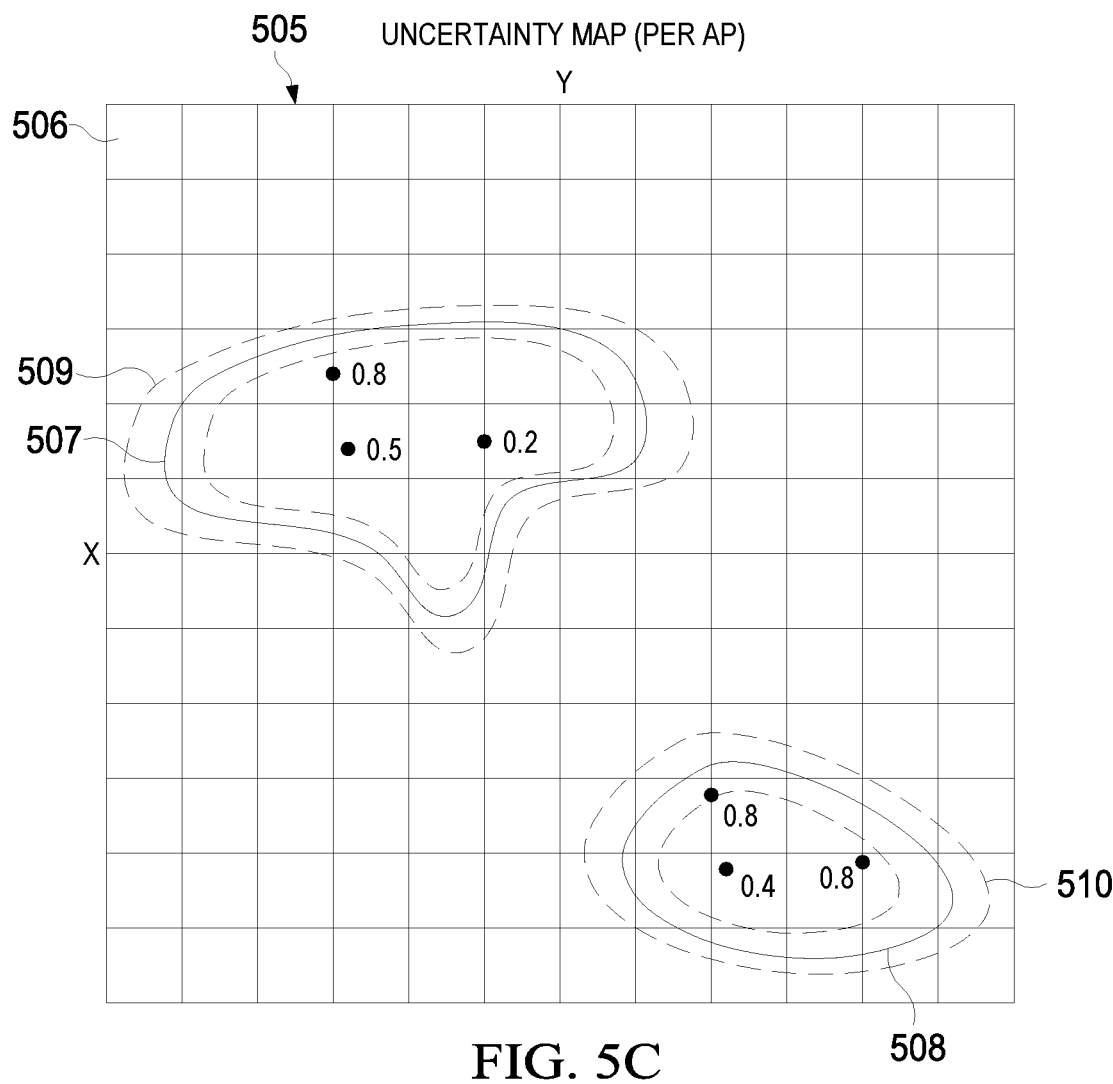

FIGS. 5A-5C illustrate contour detection and blob boundary encoding, according to an embodiment. For each AP, the RSSI values at surface control points and their associated uncertainties, are input to image processing module 502. Image processing module 502 places the RSSI values and uncertainty values on a 2D image grid and performs contour detection to define blob boundaries. The blob boundaries and the RSSI values and uncertainty values contained in the blobs are input into encoder 503. Encoder 503 encodes the boundaries and RSSI and uncertainty values, resulting in compressed radio maps 504.

Referring to FIGS. 5B and 5C, RSSI values at surface control points are projected onto image grid 505 (not shown to scale) and processed. Each RSSI value can be represented by one or more pixels 506 in image grid 505. In an embodiment, image grid 505 can be a binary image grid. For example, pixels 506 representing RSSI position data are given a value of 0 (black) and background pixels are given values of 1 (white). To assist the contour detection algorithm, in an embodiment the binary image is morphed using flat dilation (e.g., a Minkowski sum) using, for example, a disk as a structuring element with a specified radius (e.g., 3 pixels).

A contour detection algorithm is applied to the binary image to detect one or more contours from the binary image grid 505, where each contour represents a blob boundary. In the example shown, blob boundaries 507, 508 are detected. Some examples of image contour algorithms, include but are not limited to: square tracing, Moore-Neighbor tracing and radial sweep. In an embodiment, the input into a contour algorithm can be a square tessellation with at least one continuous blob formed from black pixels and the output is a sequence of boundary pixels for the blob. In some cases, there may be more than one blob in the binary image grid.

Blob boundaries 507, 508 are encoded using any suitable encoding scheme, such as predictive differential encoding. Additionally, the RSSI values at surface control points inside blob boundaries 507, 508 are encoded using any suitable encoding scheme, and selection of the encoding scheme can be based on the knowledge of the range of values to be encoded. For example, in an embodiment predictive differential encoding is used to encode the RSSI values in blobs 507, 508, which are typically in dBm and are negative double-digit integers (e.g., −70 dBm). Because of the uncertainties associated with the locations of the RSSI values in blobs 507, 508, there are uncertainty regions 509, 510 around blobs 507, 508, respectively. In an embodiment, the uncertainty values associated with locations (x, y) of the RSSI values in blobs 507, 508 are encoded using the same or different encoding scheme. For example, in an embodiment the uncertainty values can range from 0 to 1 (1=no uncertainty) and are encoded using predictive differential encoding or run length encoding. In some implementations, variable Rice coding can be used for encoding RSSI values and/or uncertainty values within blobs. The encoded RSSI values and uncertainties are stored as the aforementioned radio maps 206, which can be served to mobile devices in tiles.

Example Processes

Figure 6:
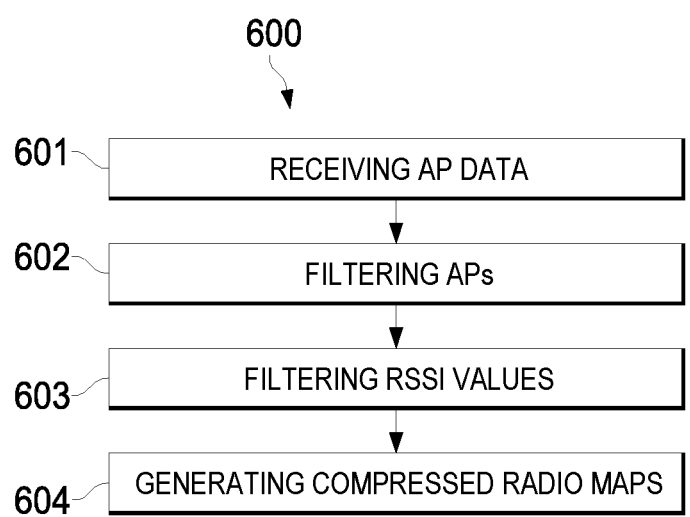
FIG. 6 is a flow diagram of a process of generating compressed AP radio maps, according to an embodiment.

FIG. 6 is a flow diagram of a process of generating compressed AP radio maps based on filtered AP data, according to an embodiment. Process 600 can be implemented by architectures 800 and 900, as described in reference to FIGS. 8 and 9, respectively.

Process 600 can begin by receiving AP data (601). The AP data is received from a plurality of mobile devices operating in a geographic region. In an embodiment, the AP data includes a reference location, RSSI values, RSSI uncertainty values and MAC addresses for each AP observed (e.g., obtained in a wireless scan) at the reference location, a timestamp and optionally other values (e.g., PDR data, barometric sensor data). The reference location can be provided by at least one of survey map data, a GNSS receiver, such a Global Positioning System (GPS) receiver and WiFi or cell tower position data. For example, a GPS receiver can provide the position coordinates (e.g., latitude and longitude) of the reference location in a local-level (geodetic) coordinate system.

Process 600 continues by filtering APs (602). For example, moving APs can be excluded from further processing. In an embodiment, AP locations can be clustered to identify moving APs, as described in reference to FIG. 2.

Process 600 continues by filtering RSSI values (603). For example, RSSI values for an AP that are outside a range define by minimum and maximum thresholds can be excluded from further processing. Also, RSSI values associated with reference locations that have large position uncertainty (e.g., a horizontal position uncertainty greater than a threshold) can be excluded from further processing.

Process 600 continues by generating compressed radio maps (604) as described in reference to FIGS. 4 and 5. The compressed radio maps include AP RSSI and uncertainty maps generated by fitting a surface to the RSSI and uncertainty values. Because only quantized RSSI values at surface control points, and their respective locations in neighboring cells of the 2D grid, are included in the AP RSSI map (rather than all of the RSSI values in the neighboring cells), compression is achieved. The compressed RSSI and uncertainty maps, collectively referred to as compressed radio maps, are stored in a radio map database. The maps can be served to mobile devices in tiles. In an embodiment, multiple versions of the radio maps having different resolutions can be stored in a quad-tree to facilitate decoding and decompression on the mobile device.

Figure 7:
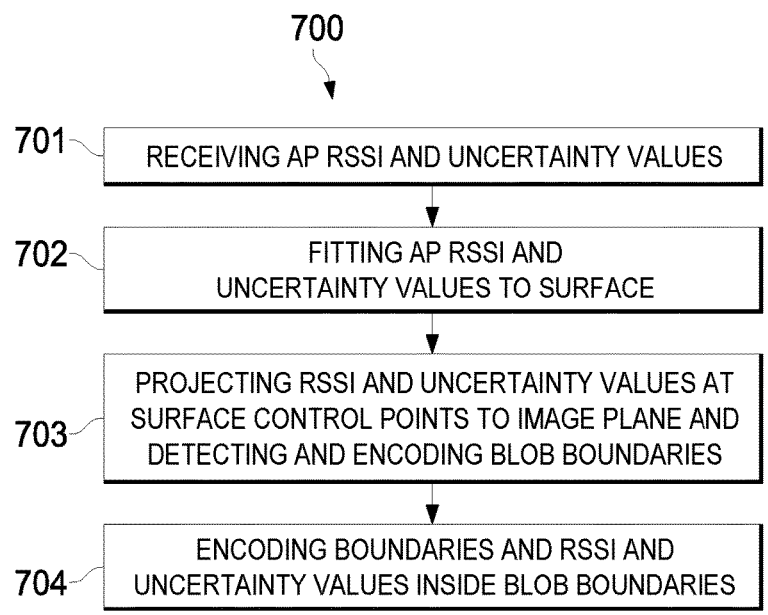
FIG. 7 is a flow diagram of a process of surface fitting and encoding, according to an embodiment.

FIG. 7 is a flow diagram of a process of surface fitting and blob boundary encoding, according to an embodiment. Process 700 can be implemented by architectures 800 and 900, as described in reference to FIGS. 8 and 9, respectively.

Process 700 can begin by receiving RSSI values and associated uncertainty values for an AP (701). The RSSI values can have reference locations from one cell or a set of neighboring cells (e.g., four cells) in a virtual grid dividing a geographic area into cells. In an embodiment, bilinear interpolation can be achieved more efficiently using a cell adjustment process. First, a course grid is selected and bilinear fitting is performed on RSSI values in the coarse grid. For each set of N neighboring cells in the coarse grid (e.g., four neighboring cells), a joint likelihood of the RSSI values falling between the N cells is computed. If the joint likelihood is below a threshold, the N cells are divided in half to create a finer grid and bilinear fitting is performed again on the finer grid. This dividing and surface fitting process continues until the joint likelihood of the N neighboring cells is greater than or equal to the threshold, at which point the process stops.

Process 700 continues by fitting a surface to the RSSI values and the uncertainty values (702). Prior to surface fitting, the RSSI values can be quantized to increase compression gain. In an embodiment, bilinear interpolation is used for surface fitting. Surface control points (e.g., four or less for bilinear) can be selected from the RSSI values based on a desired cell resolution.

Process 700 continues by projecting RSSI values at the selected surface control points to a binary image grid and determining and encoding a blob boundary (703). For example, the RSSI values and associated uncertainties at the surface control points that are projected to the binary image grid can be processed by a contour detection algorithm to determine blob boundaries, which define a geographic region where the RSSI values were harvested/surveyed.

Process 700 continues by encoding RSSI values and associated uncertainty values for an AP using one or more encoding schemes (704). The encoding results in compressed RSSI and uncertainty maps for the AP (collectively, compressed radio maps), which are stored in FP database 106 (See FIG. 1). For example, blob boundaries, RSSI values and their associated uncertainties at the surface control points can be encoded using one or more encoding schemes, including but not limited to: predictive differential encoding, run length encoding and Rice coding.

Alternative Compression Models

Figure 8:
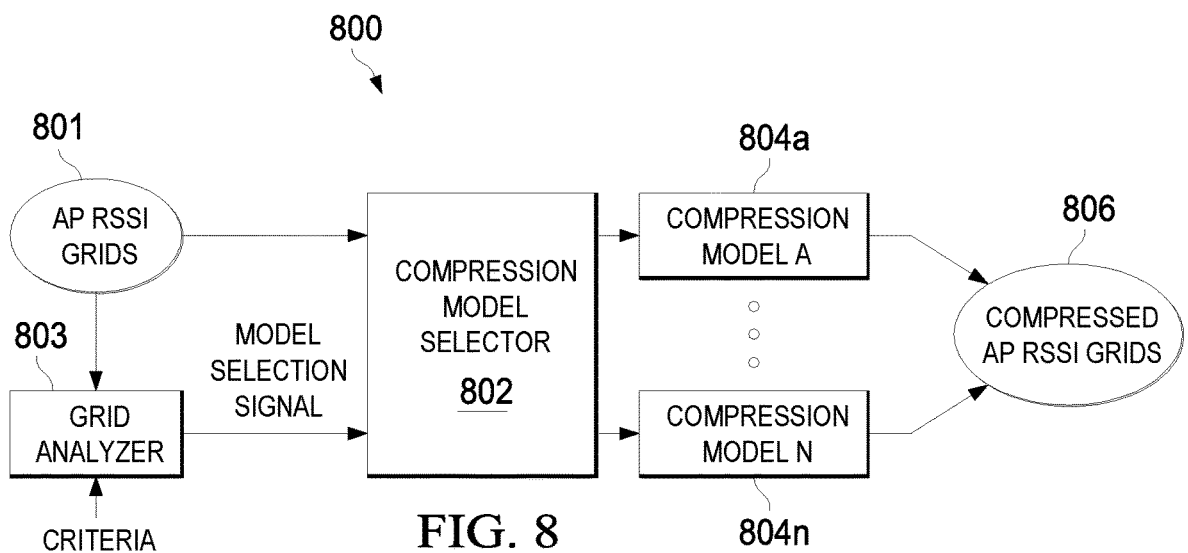
FIG. 8 is a block diagram illustrating the selection of a compression model for compressing RSSI grids, according to an embodiment.

FIG. 8 is a block diagram illustrating the selection of a compression model for compressing RSSI grids, according to an embodiment. For each AP in a geographic region, we define two grids. A first 2D grid includes RSSI values for the AP, where each RSSI value represents the mode of a probability distribution (e.g., Rayleigh distribution). A second 2D grid includes uncertainty values for the AP, where each uncertainty value represents a level of confidence in the corresponding RSSI value, and uncertainty $\epsilon[0.0, 1.0]$. An uncertainty value of 0.0 indicates a low confidence in the corresponding RSSI value. An uncertainty value of 1.0 indicates a high confidence in the corresponding RSSI value. In an embodiment, for each AP, the 2D gird of RSSI values is encoded using a log-distance path loss model, and the 2D grid of uncertainty values is encoded using run-length encoding.

Referring to FIG. 8, an AP RSSI grid is input into grid analyzer 803. Grid analyzer 803 applies N different compression models to the AP RSSI grid and computes residual error for each model. The residual errors are compared to one or more criteria and the result of the comparing is used to generate a model selection signal for the AP RSSI grid. The model selection signal is input into compression model selector 802 which selects one of the N different compression models to compress the AP RSSI grid. Each AP RSSI grid is processed in a similar manner.

In an embodiment, the N different compression models generate N predictions of the mode of the AP RSSI grid. The predictions are compared with the actual measurements in the AP RSSI grids to generate residuals $r_c$, as described in more detail below. The residuals are then used to compute a residual sum of squares (RSS). In an embodiment, the comparison criteria include a residual threshold value. If the RSS for a given grid is below the residual threshold value for that model, the model is a candidate for compressing the AP RSSI grid. In an embodiment, if there are multiple candidate compression models the compression model that is most efficient is selected to compress the AP RSSI grid. Efficiency in this context means the compression model provides a specified compression ratio with a specified accuracy and/or specified computation time.

To further clarify the process, we consider the case where there are two candidate compression models (N=2). The first compression model is a radio propagation model that predicts a path loss that a radio frequency (RF) signal encounters inside a structure or a densely populated area over distance, and the second compression model can be based on surface curve fitting, as previously described in reference to FIGS. 1-7. For example, the first compression model can be a log-distance path loss model given generally by Equation [1]:

$$PL = P_{Tx_{dBm}} - P_{Rx_{dBm}} = PL_0 - 10\gamma \log_{10} \frac{d}{d_0} + X_g, \quad [1]$$

where
PL is the total path loss measured in decibels (dB), $$P_{Tx_{dBm}} = 10\log_{10} \frac{PT_x}{1\ \text{mW}}$$

is the transmitted power in decibel-milliwatts (dBm) and $PT_x$ is transmitted power in watts, $$P_{Rx_{dBm}} = 10\log_{10} \frac{PR_x}{1\ \text{mW}}$$

is the received power in dBm and $PR_x$ is received power in watts,
$PL_0$ is path loss at a reference distance $d_0$ in dB,
$\gamma$ is a path loss exponent in dB,
d is a length of the path in kilometers or miles,
$d_0$ is a reference distance, and
$X_g$ is a Gaussian random variable with zero mean, reflecting an attenuation in dB due to fading.

Figure 9:
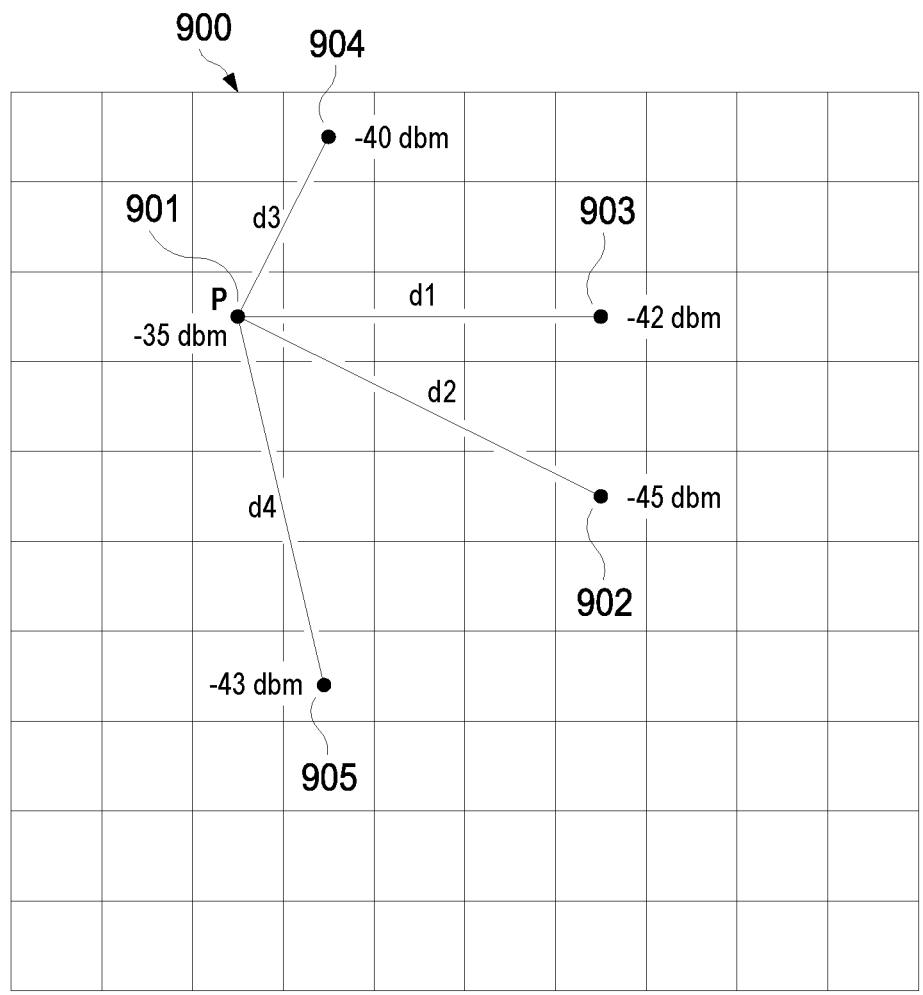
FIG. 9 illustrates a path loss compression model, according to an embodiment.

Applying the general log-distance path loss model to the present application, $PL_0$ is the maximum/peak dBm for the given AP, the reference distance $d_0$ is equal to 1 km or 1 mile, the Gaussian random variable $X_g$ is zero (assuming no path loss due to fading) and $\gamma=2.0$ (assuming a vacuum or infinite space). With these assumptions, Equation [1] reduces to Equation [2] for predicting the mode $mode_c$ of a probability distribution (e.g., a Rayleigh distribution) in each cell of the AP RSSI grid:

$$mode_c = max\_dBm - 10\gamma \log_{10} d(c, c_{max}), \quad [2]$$

where max_dBm is the maximum/peak dBm for the given AP (which may lie outside the grid), c denotes a cell in the AP RSSI grid having $mode_c$, $c_{max}$ denotes the cell in the grid having max_dBm (i.e., the AP lies physically inside $c_{max}$) and $d(c, c_{max})$ is the Euclidean distance between the center of cell c and the center of cell $c_{max}$, as described more fully in reference to FIG. 9.

Equation [2] can be used to predict the $mode_c$ for each cell c in the AP RSSI grid. In an embodiment, a non-linear least squares method is used to fit Equation [2] to the RSSI values in the AP RSSI grid. Other compression models that can be used include a Gaussian distribution and polynomials of various degrees (e.g., degree 1, degree 2, degree 3, etc.).

Note that Equation [2] has three unknowns: max_dBm, $c_{max}$ and $\gamma$. The maximum observed dBm in the grid may not be max_dBm, and the cell that contains the maximum observed dBm may not be $c_{max}$. For example, max_dBm may be outside the grid, may be unobservable or may be inaccurate due to measurement errors. One way to fit Equation [2] to the RSSI values in the AP RSSI grid is to guess the unknown parameter $c_{max}$ by trying different values of $c_{max}$. For example, $c_{max}$ can be the cell with maximum observed dBm in the grid. Given the parameter $c_{max}$, the Euclidian distance $d(c, c_{max})$ can be determined for any cell c in the AP RSSI grid. The goal is to solve for two unknowns: max_dBm and $\gamma$.

In an embodiment, a curve fitting function can be used to fit Equation [2] to the RSSI values of an AP RSSI grid using a non-linear least squares formulation. An example curve fitting function is curve_fit( ), which is available in the Python programming language at SciPy.org (https://www.scipy.org). The function curve_fit( ) takes a function $f($ ), which in this application is the log-distance path loss model defined below in the Python programming language.

```
def f(x, gamma, max_dbm):
    return max_dbm-10*gamma*np.log10(x),
``` where $x=d(c, c_{max})$ is known. Thus, the only unknowns are max_dBm and gamma.

The function curve_fit( ) also takes as parameters the vectors xdata and ydata, where xdata includes all the known Euclidean distances of each cell c to $c_{max}$ in the grid, i.e., $d(c,$ and ydata includes all the known dBms in the grid, i.e., $mode_c$ for each cell. The function curve_fit( ) also takes the following optional parameters which may be useful to fit the model to the RSSI values: p0, bounds, method. The parameter p0 is an initial guess for parameter max_dBm, which can be the maximum observed dBm in the grid, and parameter gamma, which can be 2.0 (assuming a vacuum or infinite space). The parameter bounds include the lower and upper bounds on the parameters max_dBm and gamma. The parameter method selects the method used for optimization, such as a non-linear least squares method.

In an embodiment, all possible $c_{max}$ inside the AP RSSI grid and nearby can be tried. Alternatively, the following heuristics can be used: 1) inside the grid, try cells of the top K maximum observed dBms and nearby cells, and 2) outside the grid, try cells only if the maximum observed dBm is on the boundary of the grid, and if so, try cells of the top K maximum observed dBms on the boundary and nearby cells.

For a given max_dBm, $c_{max}$ and gamma, the fitted mode dBm is computed for each cell c, denoted as $mode'_c$. The residual for cell c, denoted as $r_c$, is defined by Equation [3]:

$$r_c = |mode'_c - mode_c|, \quad [3]$$

where $mode'_c$ is the predicted mode, $mode_c$ is the observed mode for cell c and the brackets indicate absolute value. After $r_c$ is computed for each cell in the grid, RSS is computed on the residuals. As previously described, grid analyzer 803 can compute the RSS for the grid for each of the N different compression models, and then compare the results with residual threshold values to determine which compression model is most efficient for that particular AP RSSI grid.

Accordingly, for a given tile containing a number of AP RSSI grids, each AP RSSI grid can include either the log-distance path loss parameters (max_dBm, γ, $c_{max}$) or the encoded surface fitting parameters described in reference to FIGS. 1-7. The tile can then be downloaded to mobile devices for use in localization.

FIG. 9 illustrates a path loss compression model, according to an embodiment. An example AP RSSI grid 900 has 100 cells (10×10 grid). The value max_dBm is associated with cell 901. We are interested in predicting the modes in cells 902, 903, 904 and 905 using the log-distance path loss model of Equation [2]. There is a Euclidean distance d1 between the center of cell 901 and the center of cell 903, there is a Euclidean distance d2 between the center of cell 901 and the center of cell 902, there is a Euclidean distance d3 between the center of cell 901 and the center of cell 904 and there is a Euclidean distance d4 between the center of cell 901 and the center of cell 905. Using Equation [2], we can predict the modes in cells 902, 903, 904 and 905. The log-distance path loss model can be used on a mobile device to reconstruct the AP RSSI grid using the parameter set (max_dBm, γ, $c_{max}$) for each AP RSSI grid, where max_dBm, γ and $c_{max}$ are computed as previously described. Compression gain is therefore realized by parameterizing the AP RSSI grid to three parameters (note that y may be different for different AP RSSI grids). Referring to FIG. 9, using the foregoing techniques the 100 RSSI values in AP RSSI grid 900 would be replaced with three parameters: max_dBm, γ and $c_{max}$. As long as the residual RSS is below a desired residual threshold value (RSS<T) for the compression model, reconstruction of the AP RSSI grid on the mobile device will provide satisfactory results.

Alternative Compression Processes

Figure 10:
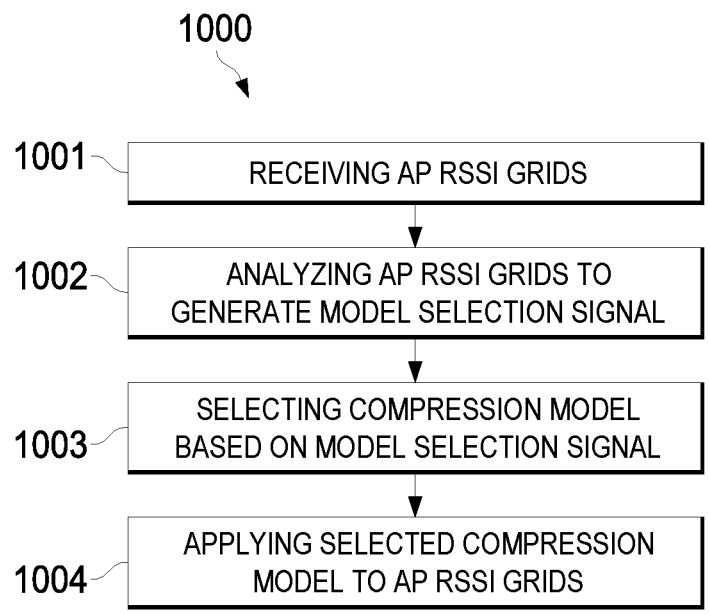
FIG. 10 is a flow diagram of a process for selecting a compression model for compressing RSSI grids, according to an embodiment.

FIG. 10 is a flow diagram of a process 1000 for selecting a compression model for compressing RSSI grids, according to an embodiment. Process 1000 can be implemented using the server architecture shown in FIG. 12.

Process 1000 can begin by receiving AP RSSI grids (1001). The AP RSSI grids can be constructed, for example, by radio map generator 204 described in reference to FIG. 2. The AP RSSI grids can be analyzed to generate a compression model selection signal (1002). For example, each compression model can be applied to each cell in an AP RSSI grid to predict a mode of a probability distribution (e.g., a Rayleigh distribution, Gaussian distribution) for that cell. A residual for the grid can be computed according to Equation [3] and compared to a residual threshold value. If the residual is less than the residual threshold value, then the compression model is a candidate for compressing the AP RSSI grid.

Process 1000 continues by selecting a compression model based on the model selection signal (1003). For example, based on the previous step there can be two or more candidate compression models. In an embodiment, the compression model that produces the lowest residual can be selected to compress the AP RSSI grid. In another embodiment, the residual and other criteria can be used to select the compression model. For example, the candidate model that is the most efficient in terms of compression ratio, accuracy and/or computation speed can be used to select the compression model. The model selection signal can be an identifier for the compression model, a flag or any other suitable data that can be used to select the compression model.

Process 1000 continues by applying the selected compression model to the AP RSSI grids (1004). For example, the compression model can parameterize the grids resulting in a compression gain, as described in reference to FIGS. 8 and 9. On the mobile device, the parameters and compression model can be used to reconstruct the AP RSSI grid with an acceptable amount of residual error, as determined in step 1002.

Example Server Architecture

Figure 11:
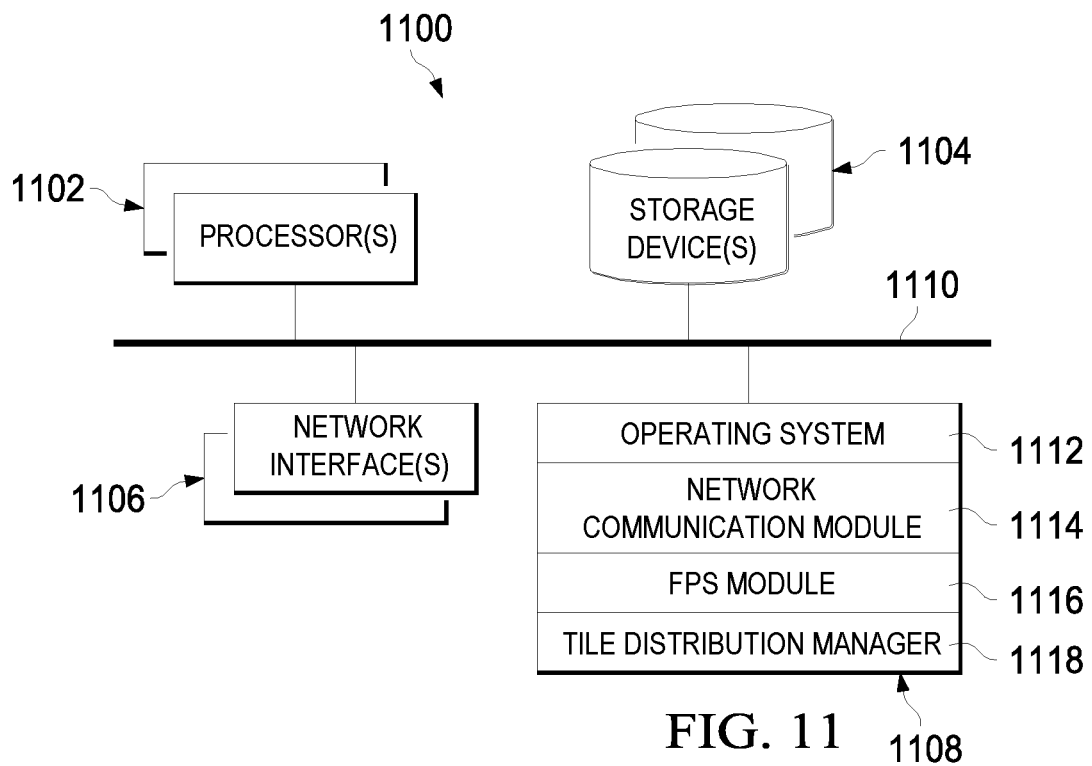
FIG. 11 illustrates an example server architecture, implementing the service-side FPS features and operations described in reference to FIGS. 1-10.

FIG. 11 is a block diagram of example server architecture 1100 for implementing the server-side features and processes described in reference to FIGS. 1-10, according to an embodiment. Other architectures are possible, including architectures with more or fewer components. In some implementations, architecture 1100 includes one or more processor(s) 1102 (e.g., dual-core Intel® Xeon® processors), one or more network interface(s) 1106, one or more storage device(s) 1104 (e.g., hard disk, optical disk, flash memory) and one or more computer-readable medium(s) 1108 (e.g., hard disk, optical disk, flash memory, etc.). These components can exchange communications and data over one or more communication channel(s) 1110 (e.g., buses), which can utilize various hardware and software for facilitating the transfer of data and control signals between components.

The term "computer-readable medium" refers to any storage medium that stores and provides instructions to processor(s) 1102 for execution, including without limitation, non-volatile media (e.g., optical or magnetic disks, ROM) and volatile media (e.g., memory, RAM). Computer-readable medium(s) 1108 can further include computer program instructions for implementing operating system 1112 (e.g., Mac OS® server, Windows® NT server), network communication stack 1114, FPS module 1116 and tile distribution manager 1118 for performing the server-side processes described in reference to FIGS. 1-10. Computer program instructions can be based on any suitable computer language (e.g., C++, Java).

Operating system 1112 can be multi-user, multiprocessing, multitasking, multithreading, real time, etc. Operating system 1112 performs basic tasks, including but not limited to: recognizing input from and providing output to devices 1102, 1104, 1106 and 1108; keeping track and managing files and directories on computer-readable medium(s) 1108 (e.g., memory or a storage device); controlling peripheral devices; and managing traffic on the one or more communication channel(s) 1110. Network communications stack 1113 includes various components for establishing and maintaining network connections (e.g., software for implementing communication protocols, such as TCP/IP, HTTP, etc.).

Architecture 1100 can be included in any computer device, including one or more server computers in a local or distributed network each having one or more processing cores. Architecture 1100 can be implemented in a parallel processing or peer-to-peer infrastructure or on a single device with one or more processors. Software can include multiple software components or can be a single body of code.

Example Mobile Device Architecture

FIG. 12 illustrates an example device architecture 1200 of a mobile device implementing client-side features and operations described in reference to FIGS. 1-10. Architecture 1200 can include memory interface 1202, one or more data processors, image processors and/or processors 1204 and peripherals interface 1206. Memory interface 1202, one or more processors 1204 and/or peripherals interface 1206 can be separate components or can be integrated in one or more integrated circuits. The various components in architecture 1200 can be coupled by one or more communication buses or signal lines.

Sensors, devices and subsystems can be coupled to peripherals interface 1206 to facilitate multiple functionalities. For example, one or more motion sensors 1210, light sensor 1212 and proximity sensor 1214 can be coupled to peripherals interface 1206 to facilitate motion sensing (e.g., acceleration, rotation rates), lighting and proximity functions of the mobile device. Location processor 1215 can be connected to peripherals interface 1206 to provide geopositioning. In some implementations, location processor 1215 can be a GNSS receiver, such as the Global Positioning System (GPS). Electronic magnetometer 1216 (e.g., an integrated circuit chip) can also be connected to peripherals interface 1206 to provide data that can be used to determine the direction of magnetic North. Electronic magnetometer 1216 can provide data to an electronic compass application. Motion sensor(s) 1210 can include one or more accelerometers and/or gyros configured to determine change of speed and direction of movement of the mobile device. Barometer 1217 can be configured to measure atmospheric pressure around the mobile device.

Camera subsystem 1220 and an optical sensor 1222, e.g., a charged coupled device (CCD) or a complementary metal-oxide semiconductor (CMOS) optical sensor, can be utilized to facilitate camera functions, such as capturing photographs and recording video clips.

Communication functions can be facilitated through one or more wireless communication subsystems 1224, which can include radio frequency (RF) receivers and transmitters (or transceivers) and/or optical (e.g., infrared) receivers and transmitters. The specific design and implementation of the communication subsystem 1224 can depend on the communication network(s) over which a mobile device is intended to operate. For example, architecture 1200 can include communication subsystems 1224 designed to operate over a GSM network, a GPRS network, EDGE network, a WiFi™ or WiMax™ network and a Bluetooth™ network. In particular, the wireless communication subsystems 1224 can include hosting protocols, such that the mobile device can be configured as a base station for other wireless devices.

Audio subsystem 1226 can be coupled to a speaker 1228 and a microphone 1230 to facilitate voice-enabled functions, such as voice recognition, voice replication, digital recording and telephony functions. Audio subsystem 1226 can be configured to receive voice commands from the user.

I/O subsystem 1240 can include touch surface controller 1242 and/or other input controller(s) 1244. Touch surface controller 1242 can be coupled to a touch surface 1246 or pad. Touch surface 1246 and touch surface controller 1242 can, for example, detect contact and movement or break thereof using any of a plurality of touch sensitivity technologies, including but not limited to capacitive, resistive, infrared and surface acoustic wave technologies, as well as other proximity sensor arrays or other elements for determining one or more points of contact with touch surface 1246. Touch surface 1246 can include, for example, a touch screen. I/O subsystem 1240 can include a haptic engine or device for providing haptic feedback (e.g., vibration) in response to commands from a processor.

Other input controller(s) 1244 can be coupled to other input/control devices 1248, such as one or more buttons, rocker switches, thumb-wheel, infrared port, USB port and/or a pointer device such as a stylus. The one or more buttons (not shown) can include an up/down button for volume control of speaker 1228 and/or microphone 1230. Touch surface 1246 or other controllers 1244 (e.g., a button) can include, or be coupled to, fingerprint identification circuitry for use with a fingerprint authentication application to authenticate a user based on their fingerprint(s).

In one implementation, a pressing of the button for a first duration may disengage a lock of the touch surface 1246; and a pressing of the button for a second duration that is longer than the first duration may turn power to the mobile device on or off. The user may be able to customize a functionality of one or more of the buttons. The touch surface 1246 can, for example, also be used to implement virtual or soft buttons and/or a virtual touch keyboard.

In some implementations, the mobile device can present recorded audio and/or video files, such as MP3, AAC and MPEG files. In some implementations, the mobile device can include the functionality of an MP3 player. Other input/output and control devices can also be used.

Memory interface 1202 can be coupled to memory 1250. Memory 1250 can include high-speed random-access memory and/or non-volatile memory, such as one or more magnetic disk storage devices, one or more optical storage devices and/or flash memory (e.g., NAND, NOR). Memory 1250 can store operating system 1252, such as iOS, Darwin, RTXC, LINUX, UNIX, OS X, WINDOWS, or an embedded operating system such as VxWorks. Operating system 1252 may include instructions for handling basic system services and for performing hardware dependent tasks. In some implementations, operating system 1252 can include a kernel (e.g., UNIX kernel).

Memory 1250 may also store communication instructions 1254 to facilitate communicating with one or more additional devices, one or more computers and/or one or more servers, such as, for example, instructions for implementing a software stack for wired or wireless communications with other devices. Memory 1250 may include graphical user interface instructions 1256 to facilitate graphic user interface processing; sensor processing instructions 1258 to facilitate sensor-related processing and functions; phone instructions 1260 to facilitate phone-related processes and functions; electronic messaging instructions 1262 to facilitate electronic-messaging related processes and functions; web browsing instructions 1264 to facilitate web browsing-related processes and functions; media processing instructions 1266 to facilitate media processing-related processes and functions; GNSS/Location instructions 1268 to facilitate generic GNSS and location-related processes and instructions, including processed described in reference to FIGS. 1-13; and camera instructions 1270 to facilitate camera-related processes and functions. Memory 1250 further includes radio map decoding/decompression instructions 1272 for decompressing compressed radio maps. The memory 1250 may also store other software instructions (not shown), such as security instructions, web video instructions to facilitate web video-related processes and functions and/or web shopping instructions to facilitate web shopping-related processes and functions. In some implementations, the media processing instructions 1266 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. Memory 1250 can include additional instructions or fewer instructions. Furthermore, various functions of the mobile device may be implemented in hardware and/or in software, including in one or more signal processing and/or application specific integrated circuits.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

What is claimed is:

1. A method comprising:
    receiving, by a computing device, access point (AP) data from a plurality of mobile devices operating in a geographic region, the AP data including signal strength measurements of AP signals received at a plurality of reference locations in the geographic region and uncertainty measurements associated with the signal strength measurements;
    determining a level of accuracy with a first compression model;
    responsive to the determining, selecting one of the first compression model or a second compression model to compress the AP data, the second compression model being different than the first compression model;
    compressing the AP data using the selected compression model; and
    responsive to a request from a mobile device operating in the geographic region, sending a data packet including the compressed AP data to the mobile device.
2. The method of claim 1, wherein the first compression model is a radio propagation model that predicts a path loss that a radio frequency (RF) signal encounters inside a structure or a densely populated area over distance.
3. The method of claim 2, wherein the path loss model is a log-distance path loss model given by $$mode_c = max\_dBm - 10\gamma \log_{10} d(c, c_{max}),$$

where $mode_c$ is a predicted mode of a probability distribution of the signal strength measurements in a cell c of a two-dimensional (2D) grid of cells associated with an AP, max_dBm is the maximum signal strength in a cell $c_{max}$ of the 2D grid, $\gamma$ is a path loss coefficient and $d(c, c_{max})$ is the Euclidean distance between the center of cell c and the center of cell $c_{max}$.

4. The method of claim 3, wherein determining the level of accuracy with the first compression model further comprises:
    computing residuals between predicted modes computed from the first compression model and actual modes obtained from the signal strength data;
    calculating a residual sum of squares of the residuals;
    comparing the residual sum of squares with a residual threshold value; and
    selecting the first compression model for compressing the signal strength measurements in the AP data based on results of the comparing.
5. The method of claim 3, wherein a curve fitting function is used to fit the log-distance path loss model to the signal strength measurements using a non-linear least squares formulation.
6. The method of claim 3, wherein $mode_c$ is a predicted mode of a Rayleigh probability distribution.
7. The method of claim 1, wherein the second compression model includes fitting a surface to the signal strength measurements.
8. The method of claim 1, further comprising:
    filtering the AP data to remove outlier AP data.
9. The method of claim 8, wherein filtering AP data further comprises:
    identifying non-servable APs in the AP data; and
    excluding the non-servable APs from further processing.
10. The method of claim 8, wherein filtering AP data further comprises:
    clustering the AP data;
    identifying outlier AP signal strength measurements based on the clustering; and
    excluding outlier AP signal strength measurements from further processing.
11. A system comprising:
    one or more processors;
    memory storing instructions, that when executed by one or more processors, cause the one or more processors to perform operations comprising:
        receiving access point (AP) data from a plurality of mobile devices operating in a geographic region, the AP data including signal strength measurements of AP signals received at a plurality of reference locations in the geographic region and uncertainty measurements associated with the signal strength measurements;
        determining a level of accuracy with a first compression model;
        responsive to the determining, selecting one of the first compression model or a second compression model to compress the AP data, the second compression model being different than the first compression model;

compressing the AP data using the selected compression model; and responsive to a request from a mobile device operating in the geographic region, sending a data packet including the compressed AP data to the mobile device.

12. The system of claim 11, wherein the first compression model is a radio propagation model that predicts a path loss that a radio frequency (RF) signal encounters inside a structure or a densely populated area over distance.

13. The system of claim 12, wherein the path loss model is a log-distance path loss model given by $$mode_c = max\_dBm - 10\gamma \log_{10} d(c, c_{max}),$$

where $mode_c$ is a predicted mode of a probability distribution of the signal strength measurements in a cell c of a two-dimensional (2D) grid of cells associated with an AP, max_dBm is the maximum signal strength in a cell $c_{max}$ of the 2D grid, $\gamma$ is a path loss coefficient and $d(c, c_{max})$ is the Euclidean distance between the center of cell c and the center of cell $c_{max}$.

14. The system of claim 13, wherein determining the level of accuracy with the first compression model further comprises:

computing residuals between predicted modes computed from the first compression model and actual modes obtained from the signal strength data;

calculating a residual sum of squares of the residuals;

comparing the residual sum of squares with a residual threshold value; and selecting the first compression model for compressing the signal strength measurements in the AP data based on results of the comparing.

15. The system of claim 13, wherein a curve fitting function is used to fit the log-distance path loss model to the signal strength measurements using a non-linear least squares formulation.

16. The system of claim 13, wherein $mode_c$ is a predicted mode of a Rayleigh probability distribution.

17. The system of claim 11, wherein the second compression model includes fitting a surface to the signal strength measurements.

18. The system of claim 11, further comprising:
filtering the AP data to remove outlier AP data.

19. The system of claim 18, wherein filtering AP data further comprises:

identifying non-servable APs in the AP data; and excluding the non-servable APs from further processing.

20. The system of claim 18, wherein filtering AP data further comprises:

clustering the AP data;

identifying outlier AP signal strength measurements based on the clustering; and excluding outlier AP signal strength measurements from further processing.

* * * * *